(12) United States Patent
Hitchcock

(10) Patent No.: US 7,993,084 B2
(45) Date of Patent: Aug. 9, 2011

(54) FASTENER

(75) Inventor: Cory M. Hitchcock, Granite Falls, WA (US)

(73) Assignee: Boeing Company, Chicago, IL (US)

( * ) Notice: Subject to any disclaimer, the term of this patent is extended or adjusted under 35 U.S.C. 154(b) by 0 days.

(21) Appl. No.: 11/513,925

(22) Filed: Aug. 30, 2006

(65) Prior Publication Data

US 2008/0056840 A1 Mar. 6, 2008

(51) Int. Cl.
*F16B 13/02* (2006.01)
(52) U.S. Cl. ............................................ 411/45; 411/55
(58) Field of Classification Search .................. 411/41, 411/45–48, 55, 414, 453, 182, 508
See application file for complete search history.

(56) References Cited

U.S. PATENT DOCUMENTS

| | | | | | |
|---|---|---|---|---|---|
| 248,164 | A | * | 10/1881 | Harvey | 411/414 |
| 2,649,884 | A | * | 8/1953 | Westover | 411/173 |
| 2,788,047 | A | * | 4/1957 | Rapata | 411/182 |
| 2,956,605 | A | * | 10/1960 | Rapata | 411/531 |
| 3,449,799 | A | * | 6/1969 | Bien | 411/548 |
| 3,572,751 | A | * | 3/1971 | Burr et al. | 280/750 |
| 3,756,116 | A | * | 9/1973 | Schuplin | 411/15 |
| 3,865,006 | A | * | 2/1975 | Massoney | 411/394 |
| 4,033,223 | A | * | 7/1977 | Marks | 411/15 |
| 4,263,833 | A | * | 4/1981 | Loudin et al. | 411/41 |
| 4,367,995 | A | * | 1/1983 | Mizusawa et al. | 411/80.2 |
| 4,478,545 | A | * | 10/1984 | Mizusawa et al. | 411/80.1 |
| 4,579,492 | A | * | 4/1986 | Kazino et al. | 411/80.1 |
| 4,600,344 | A | * | 7/1986 | Sutenbach et al. | 411/435 |
| 4,648,766 | A | * | 3/1987 | Wollar | 411/41 |
| 4,756,654 | A | * | 7/1988 | Clough | 411/437 |
| 4,948,314 | A | * | 8/1990 | Kurosaki | 411/182 |
| 4,978,265 | A | * | 12/1990 | De Wan | 411/80.2 |
| 5,409,323 | A | * | 4/1995 | Greene | 403/343 |
| 5,707,097 | A | * | 1/1998 | Horwill | 296/91 |
| 6,186,695 | B1 | * | 2/2001 | Kuster | 403/297 |
| 6,332,289 | B1 | * | 12/2001 | Chu | 49/375 |
| 6,514,023 | B2 | | 2/2003 | Moerke | |
| 6,712,571 | B2 | * | 3/2004 | Krohlow et al. | 411/45 |

OTHER PUBLICATIONS http://www.itw.fastex.com/index.php/dw/op/a/6/c/16/p/6?m=no.

* cited by examiner

*Primary Examiner* — Flemming Saether
(74) *Attorney, Agent, or Firm* — Tung & Associates

(57) ABSTRACT

A fastener includes a fastener body having a screw opening, a plurality of resilient fastener fingers extending from the fastener body, a finger tooth extending from each of the plurality of fastener fingers and a fastener screw extending through the screw opening and between the plurality of fastener fingers. The fastener screw is adapted for push installation through the screw opening and between the plurality of fastener fingers and threaded removal from the screw opening and between the plurality of fastener fingers.

18 Claims, 2 Drawing Sheets

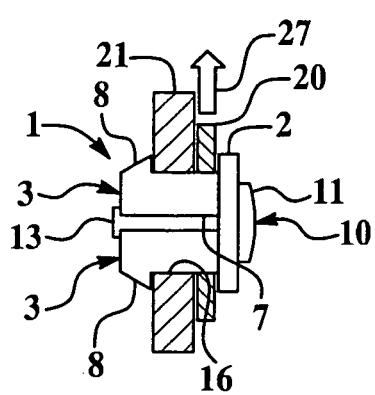
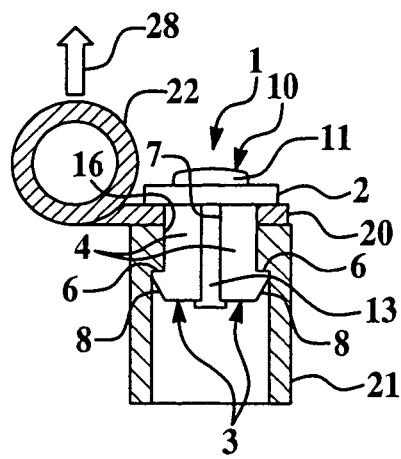
FIG. 9　　　　　FIG. 10
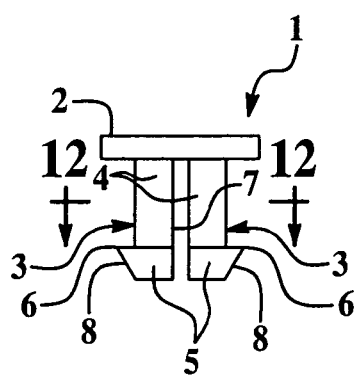
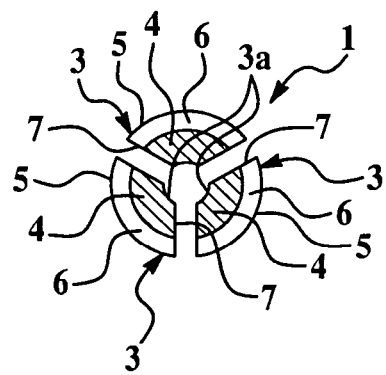
FIG. 11　　　　　FIG. 12
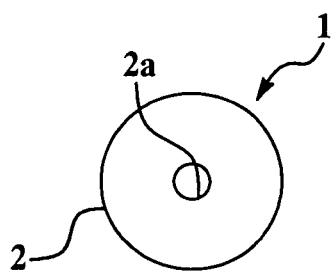
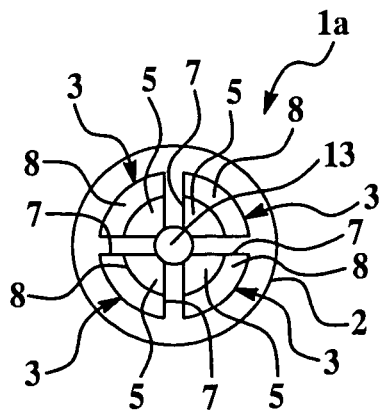
FIG. 13　　　　　FIG. 14

FASTENER

FIELD OF THE INVENTION

The present invention relates to fasteners such as rivets. More particularly, the present invention relates to a fastener which can be manually installed in the attachment of structural elements to each other.

BACKGROUND OF THE INVENTION

A variety of rivets and other fasteners are known for attaching structural elements to each other. Typically, a conventional push-type rivet requires an interference fit and wedging effect to secure structural elements to each other. However, these types of rivets can be difficult to install, sometimes requiring the use of a mallet.

SUMMARY OF THE INVENTION

The present invention is generally directed to a fastener which is suitable for securing first and second structural elements to each other with incidental or light loading. An illustrative embodiment of the fastener includes a fastener body having a screw opening, a plurality of resilient fastener fingers extending from the fastener body, a finger tooth extending from each of the plurality of fastener fingers and a fastener screw extending through the screw opening and between the plurality of fastener fingers. The fastener screw is adapted for push installation through the screw opening and between the plurality of fastener fingers and threaded removal from the screw opening and between the plurality of fastener fingers.

BRIEF DESCRIPTION OF THE DRAWINGS

The invention will now be described, by way of example, with reference to the accompanying drawings, in which:

FIG. 9 is a side view of the fastener, inserted through fastener openings extending through first and second structural elements (shown in section), more particularly illustrating a shear test applied to the fastener.

FIG. 10 is a side view of the fastener, inserted through fastener openings extending through first and second structural elements (shown in section), more particularly illustrating a bend test applied to the fastener.

FIG. 11 is a side view of the fastener, with the fastener screw (not shown) removed from the fastener.

FIG. 12 is a sectional view, taken along section lines 12-12 in FIG. 11.

FIG. 13 is a top view of the fastener, with the fastener screw (not shown) removed from the fastener.

FIG. 14 is a bottom view of an alternative embodiment of the fastener.

DETAILED DESCRIPTION OF THE INVENTION

Figure 1:
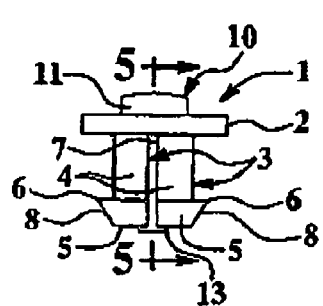
FIG. 1 is a side view of an illustrative embodiment of the fastener, with a fastener screw extending through the fastener.

Referring initially to FIGS. 1-7 and 11-14, an illustrative embodiment of the fastener is generally indicated by reference numeral 1. The fastener 1 is a high-strength, flexible, elastic or resilient plastic material such as nylon 66 or polyetheretherketone (PEEK), for example. However, alternative high-strength plastic materials known to those skilled in the art may be used instead. The fastener 1 includes a fastener body 2 which typically has a disc-shaped configuration. As shown in FIG. 13, a screw opening 2a extends through the fastener body 2.

Figure 3:
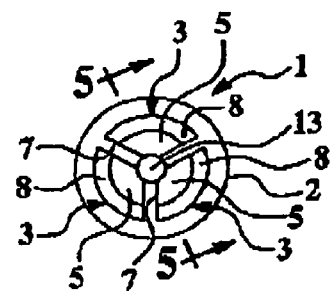
FIG. 3 is a bottom view of the fastener.
Figure 4:
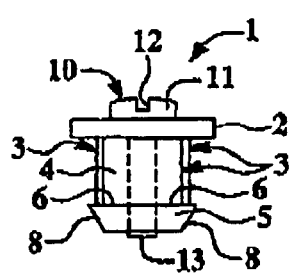
FIG. 4 is a side view of the fastener, with the fastener screw shown partially in phantom.
Figure 5:
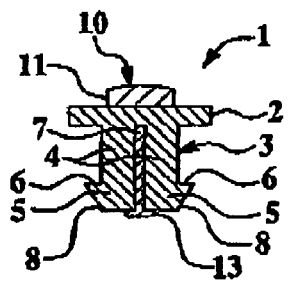
FIG. 5 is a sectional view, taken along section lines 5-5 in FIG. 3.

Multiple fastener fingers 3 extend from one planar surface of the fastener body 2. As shown in FIG. 3, in a typical embodiment, at least three fastener fingers 3 extend from the fastener body 2 in spaced-apart relationship with respect to each other. As shown in FIG. 14, four fastener fingers 3 extend from the fastener body 2 in an alternative embodiment of the fastener 1a. As shown in FIGS. 3 and 14, the fastener fingers 3 are clustered together in adjacent relationship with respect to each other.

As shown in FIG. 11, each fastener finger 3 typically includes an elongated finger shaft 4 which extends from the fastener body 2. A finger head 5 terminates the extending end of each finger shaft 4. A finger tooth 6 extends outwardly from the finger head 5. As shown in FIG. 12, in a typical embodiment of the fastener 1, each finger shaft 4, finger head 5 and finger tooth 6 has a generally curved or arcuate cross-section. Fastener slots 7 separate the finger shafts 4 of the adjacent fastener fingers 3 from each other. As shown in FIG. 11, a finger bevel 8 is typically provided in the outer surface of the finger head 5 of each fastener finger 3. A fixed grip length of the fastener 1 is defined by and between the fastener body 2 and the finger teeth 6 of the finger heads 5.

Figure 2:
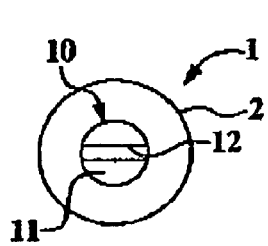
FIG. 2 is a top view of the fastener.

As shown in FIG. 12, screw notches 3a are provided in the inner surfaces of the finger shafts 4 of the respective fastener fingers 3. The screw notches 3a are aligned with the screw opening 2a (FIG. 13) which extends through the fastener body 2 of the fastener 1. As shown in FIGS. 1-7, the screw opening 2a of the fastener body 2 and the screw notches 3a of the respective fastener fingers 3 are adapted to receive a fastener screw 10. The fastener screw 10 is typically plastic and, as shown in FIG. 7, includes a screw head 11 from which extends a screw shank 13 with threads 13A that is adapted to extend through the screw opening 2a and screw notches 3a. As shown in FIG. 2, a screwdriver slot 12 is typically provided in the screw head 11.

As shown in FIG. 2, the screwdriver slot 12 may be configured to receive a flat-bladed screwdriver (not shown). Alternatively, the screwdriver slot 12 may be configured to receive a Phillips-headed screwdriver (not shown). The fastener screw 10 may be, for example, a push-in screw-out type of screw which is known by those skilled in the art. Therefore, the fastener screw 10 is adapted to be manually pushed into place through the screw opening 2a and screw notches 3a, respectively, of the fastener 1 and removed from the fastener 1 by engagement of a screwdriver (not shown) with the screwdriver slot 12 in the screw head 11, followed by rotation of the screwdriver. As shown in FIG. 7, when the fastener screw 10 is not inserted in the screw opening 2a and screw notches 3a, the fastener fingers 3 are capable of bending inwardly toward and against each other. When the fastener screw 10 is inserted in the screw opening 2a and screw notches 3a, the screw shank 13 pushes the fastener fingers 3 outwardly and away from each other, as shown in FIGS. 1 and 3-6.

Figure 6:
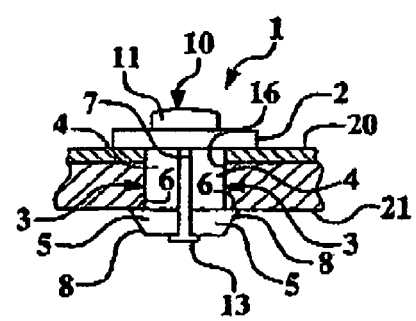
FIG. 6 is a side view of the fastener, with first and second structural elements (shown in section) held together using the fastener.
Figure 7:
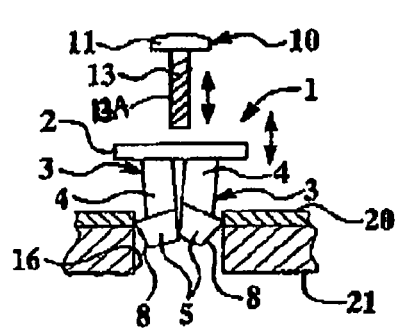
FIG. 7 is an exploded side view illustrating typical insertion of the fastener into fastener openings extending through first and second structural elements (shown in section), followed by extension of a screw through the fastener in typical installation of the fastener.

Referring next to FIGS. 6 and 7, the fastener 1 is used to quickly and efficiently secure a first structural element 20 to a second structural element 21 under circumstances in which incidental or light loading is applied to the first structural element 20 and the second structural element 21. The fastener 1 can also be used under circumstances in which it may become necessary to facilitate quick detachment of the first structural element 20 from the second structural element 21. As shown in FIG. 7, with the fastener screw 10 initially removed from the fastener 1, the fastener fingers 3 of the fastener 1 are inserted through registering fastener openings 16 which extend through the first structural element 20 and the second structural element 21. As the fastener fingers 3 pass through the registering fastener openings 16, the sides of the fastener openings 16 deform and constrict or compress the flexible fastener fingers 3 toward and against each other. Upon full insertion of the fastener 1 in the fastener openings 16, the fastener fingers 3 expand or recoil outwardly as the fastener body 2 engages a surface of the first structural element 20 and the finger tooth 6 of each fastener finger 3 engages a surface of the second structural element 21.

The screw shank 13 of the fastener screw 10 is then pushed through the screw opening 2a (FIG. 13) of the fastener body 2 and the screw notches 3a (FIG. 12) of the fastener fingers 3, typically by applying manual thumb pressure to the screw head 11 of the fastener screw 10. As it extends through the screw notches 3a (FIG. 12) of the fastener fingers 3, the screw shank 13 pushes or expands the fastener fingers 3 outwardly against the interior surfaces of the fastener openings 16 in the first structural element 20 and second structural element 21 such that the finger tooth 6 of each fastener finger 3 remains in secure abutment or engagement with the surface of the second structural element 21. Therefore, as shown in FIG. 6, the first structural element 20 and the second structural element 21 are sandwiched or gripped between the fastener body 2 and the finger tooth 6 of each fastener finger 3. This aggressive bite characteristic of the fastener fingers 3 and finger teeth 6 prevents inadvertent separation of the first structural element 20 and the second structural element 21 from each other.

The fastener 1 can be removed from the fastener openings 16 by inserting a screwdriver (not shown) into the screwdriver slot 12 in the screw head 11 of the fastener screw 10 and rotating the fastener screw 10. This facilitates unthreading of the fastener screw 10 from the screw notches 3a in the fastener fingers 3 and the screw opening 2a in the fastener body 2. Consequently, the fastener fingers 3 can again be deformed or compressed towards and against each other, as shown in FIG. 7, facilitating removal of the fastener 1 from the fastener openings 16 and detachment of the first structural element 20 from the second structural element 21, as deemed necessary. In one embodiment of the fastener 1 (not shown), crushing ribs may be provided along the side of the fastener body 2 and/or each fastener finger 3 to create an interference fit with the first structural element 20 and/or the second structural element 21 and prevent the fastener 1 from rotating in the fastener openings 16 during unthreading of the fastener screw 10.

Figure 8:
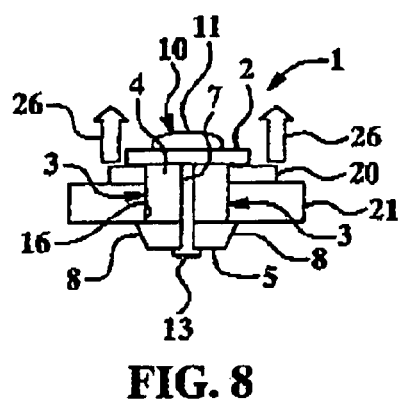
FIG. 8 is a side view of the fastener, inserted through fastener openings extending through first and second structural elements (shown in section), more particularly illustrating a tensile test applied to the fastener.

Referring next to FIGS. 8-10, a retention force test applied to the fastener 1 is shown. The retention force test includes a tensile test applied to the fastener 1 in FIG. 8; a shear test applied to the fastener 1 in FIG. 9; and a bending test applied to the fastener 1 in FIG. 10. In the tensile test shown in FIG. 8, a tensile force 26 is applied to the fastener 1 along a direction away from the first structural element 20. In the shear test shown in FIG. 9, a shear force 27 is applied to the first structural element 20 along an axis which is perpendicular to the axis of the fastener fingers 3. In the bending test shown in FIG. 10, a bending force 28 is applied to the first structural element 20, forming a loop 22 in the first structural element 20. It has been found that the fastener 1 is capable of withstanding a tensile force 26 of up to 305 lbs., a sheer force 27 of up to 185 lbs. and a bending force 28 of up to 85 lbs. The results of eight different shear, tensile and bending tests as applied to the fastener 1 in a retention force test are shown in Table (I) below:

TABLE I

| Sample No. | Shear (F-lbs.) | Tensile (F-lbs.) | Bending (F-lbs.) |
| --- | --- | --- | --- |
| 1 | 280 | 180 | 70 |
| 2 | 280 | 170 | 75 |
| 3 | 280 | 175 | 60 |
| 4 | 280 | 185 | 80 |
| 5 | 305 | 165 | 80 |
| 6 | 300 | 180 | 75 |
| 7 | 280 | 180 | 80 |
| 8 | 290 | 175 | 85 |

In a separate retention force test, the fastener 1 exhibited an ultimate tensile force capacity of about 195 lbs. and an ultimate shear force capacity of about 350 lbs.

Although this invention has been described with respect to certain exemplary embodiments, it is to be understood that the specific embodiments are for purposes of illustration and not limitation, as other variations will occur to those of ordinary skill in the art.

What is claimed is:

1. A fastener, comprising:
   a fastener body having a screw opening;
   a plurality of resilient fastener fingers each having an elongated shaft, each shaft comprising a pie slice shaped portion of a cylinder, an outer portion of said cylinder consisting of an entirely uninterrupted convex outer surface, said convex outer surface comprising an arcuate cross section transverse to said elongated shaft, said uninterrupted convex outer surface adjacently extending from a planar surface of said fastener body, said uninterrupted convex outer surface without a groove and adapted to engage a second surface upon expansion of said fastener fingers;
   a finger tooth extending from each of said plurality of fastener finger shafts, said planar surface of said fastener body and said finger teeth adapted to respectively contact and hold together respective structural elements;
   a threaded fastener screw directly engaging said fastener body extending through said screw opening and between said plurality of fastener fingers, a plurality of screw notches provided in said plurality of fastener fingers, respectively, and aligned with said screw opening to receive said threaded fastener screw; and
   wherein said threaded fastener screw is adapted to be push installed without rotation through said screw opening and between said plurality of fastener fingers and threadably removed with rotation from said screw opening and between said plurality of fastener fingers.

2. The fastener of claim 1 wherein said plurality of fastener fingers comprises at least three fastener fingers clustered together in adjacent relationship with respect to each other.

3. The fastener of claim 1 wherein said fastener body and said plurality of fastener fingers has a tensile force capacity of about 195 lbs.

4. The fastener of claim 1 wherein said fastener body and said plurality of fastener fingers has a shear force capacity of about 350 lbs.

5. The fastener of claim 1 wherein each of said fastener fingers comprises a finger head provided on said finger shaft, and wherein said finger tooth extends from said finger head.

6. The fastener of claim 5 further comprising a finger bevel provided on said finger head.

7. The fastener of claim 1 wherein said fastener body and said plurality of fastener fingers is nylon or polyetheretherketone.

8. A fastener, comprising:
a fastener body having a screw opening;
a plurality of resilient fastener fingers each having an elongated shaft, each shaft comprising a pie slice shaped portion of a cylinder, an outer portion of said cylinder consisting of an entirely uninterrupted convex outer surface, said convex outer surface comprising an arcuate cross section transverse to said elongated shaft, said uninterrupted convex outer surface adjacently extending from a planar surface of said fastener body, said uninterrupted convex outer surface without a groove and adapted to engage a second surface upon expansion of said fastener fingers, said fastener fingers clustered together in adjacent relationship with respect to each other;
a plurality of finger slots separating said fastener fingers from each other;
a finger tooth extending from each of said plurality of fastener finger shafts, said planar surface of said fastener body and said finger teeth adapted to respectively contact and hold together respective structural elements;
a threaded fastener screw having a screw head directly engaging said fastener body and a screw shank extending from said screw head through said screw opening and between said plurality of fastener fingers, a plurality of screw notches provided in said plurality of fastener fingers, respectively, and aligned with said screw opening to receive said threaded fastener screw; and
wherein said threaded fastener screw is adapted to be push installed without rotation through said screw opening and between said plurality of fastener fingers and threadably removed with rotation from said screw opening and between said plurality of fastener fingers.

9. The fastener of claim 8 wherein said plurality of fastener fingers comprises at least three fastener fingers clustered together in adjacent relationship with respect to each other.

10. The fastener of claim 8 wherein said fastener body and said plurality of fastener fingers has a tensile force capacity of about 195 lbs.

11. The fastener of claim 8 wherein said fastener body and said plurality of fastener fingers has a shear force capacity of about 350 lbs.

12. The fastener of claim 8 wherein each of said fastener fingers comprises a finger head provided on said finger shaft, and wherein said finger tooth extends from said finger head.

13. The fastener of claim 12 further comprising a finger bevel provided on said finger head.

14. The fastener of claim 8 wherein said fastener body and said plurality of fastener fingers is nylon or polyetheretherketone.

15. A fastener, comprising:
a fastener body having a screw opening;
a plurality of resilient fastener fingers having a plurality of elongated finger shafts, respectively, each of said shafts comprising a pie slice shaped portion of a cylinder, an outer portion of said cylinder consisting of an entirely uninterrupted convex outer surface, said convex outer surface comprising an arcuate cross section transverse to said elongated shaft, said uninterrupted convex outer surface adjacently extending from a planar surface of said fastener body, said uninterrupted convex outer surface without a groove and adapted to engage a second surface upon expansion of said fastener fingers, said plurality of fastener fingers clustered together in adjacent relationship with respect to each other and a plurality of finger heads provided on said plurality of finger shafts, respectively;
a plurality of finger slots separating said plurality of finger shafts of said plurality of fastener fingers, respectively, from each other;
a plurality of finger teeth extending from said plurality of finger heads, respectively, said planar surface of said fastener body and said finger teeth adapted to respectively contact and hold together respective structural elements;
a plurality of screw notches aligned with said screw opening provided in said plurality of finger shafts, respectively, of said plurality of fastener fingers said plurality screw notches adapted to receive a threaded fastener screw;
said threaded fastener screw having a screw head directly engaging said fastener body and a screw shank extending from said screw head through said screw opening and said plurality of screw notches; and
wherein said threaded fastener screw is adapted to be push installed without rotation through said screw opening and said plurality of screw notches and threadably removed with rotation from said screw opening and said plurality of screw notches.

16. The fastener of claim 15 wherein said fastener body and said plurality of fastener fingers has a tensile force capacity of about 195 lbs.

17. The fastener of claim 15 wherein said fastener body and said plurality of fastener fingers has a shear force capacity of about 350 lbs.

18. The fastener of claim 15 wherein said fastener body and said plurality of fastener fingers is nylon or polyetheretherketone.

* * * * *